United States Patent [19]

Levine et al.

[11] Patent Number: 4,910,966
[45] Date of Patent: Mar. 27, 1990

[54] HEAT PUMP WITH SINGLE EXTERIOR TEMPERATURE SENSOR

[75] Inventors: Michael Levine, Boca Raton, Fla.; James Russo, Ann Arbor, Mich.; Victor Rigotti, Ann Arbor, Mich.; Nicholas Skogler, Ypsilanti, Mich.

[73] Assignee: Honeywell, Inc., Minneapolis, Minn.

[21] Appl. No.: 256,903

[22] Filed: Oct. 12, 1988

[51] Int. Cl.$^4$ .............................................. F25D 17/00
[52] U.S. Cl. ....................................... 62/129; 62/156; 62/180; 364/557
[58] Field of Search ................. 62/156, 155, 234, 207, 62/214, 182, 180, 80, 129; 374/147, 102; 364/557

[56] References Cited

U.S. PATENT DOCUMENTS

| | | | |
|---|---|---|---|
| 2,947,153 | 8/1960 | Atchison | 62/156 |
| 3,070,972 | 1/1963 | Atchison | 62/180 |
| 4,209,994 | 7/1980 | Mueller et al. | 62/155 |
| 4,253,130 | 2/1981 | Newell | 361/22 |
| 4,302,947 | 12/1981 | Mueller et al. | 62/155 |
| 4,328,680 | 5/1982 | Stamp et al. | 62/155 |
| 4,338,790 | 7/1982 | Saunders et al. | 62/80 |
| 4,373,349 | 2/1983 | Mueller | 62/156 |
| 4,406,133 | 9/1983 | Saunders et al. | 62/80 |
| 4,417,452 | 11/1983 | Ruminsky et al. | 62/156 X |
| 4,439,995 | 4/1984 | McCarty | 62/156 |
| 4,608,832 | 9/1986 | Sabin et al. | 62/140 |
| 4,627,245 | 12/1986 | Levine | 62/157 |
| 4,662,184 | 5/1987 | Pohl et al. | 62/156 |
| 4,751,825 | 6/1988 | Voorhis et al. | 62/156 X |
| 4,773,587 | 9/1988 | Lipman | 236/11 |

*Primary Examiner*—Harry B. Tanner
*Attorney, Agent, or Firm*—Krass & Young

[57] ABSTRACT

The present invention is a method and apparatus for determining the exterior ambient temperature in a heat pump. In accordance with the prior art the heat pump defrosts the exterior heat exchanger if the exterior heat exchanger temperature has a predetermined relationship to the exterior ambient temperature. The exterior heat exchanger temperature is measured directly via a temperature sensor. The improvement of the present invention includes operating the exterior fan after operation of the compressor, while repetitively measuring the temperature of the exterior heat exchanger until reaching a plateau temperature other than freezing. The exterior ambient temperature is set to the plateau temperature. In the event that the plateau temperature equals freezing, the exterior ambient temperature is set equal to a compromise temperature slightly above freezing, preferably 34 degrees Fahrenheit.

11 Claims, 4 Drawing Sheets

HEAT PUMP WITH SINGLE EXTERIOR TEMPERATURE SENSOR

TECHNICAL FIELD OF THE INVENTION

The technical field of the present invention is the control of heat pumps, and in particular the control of heat pumps to provide defrosting operation.

BACKGROUND OF THE INVENTION

Heat pumps are temperature modification devices which are typically employed to heat an interior space. Heat pumps operate to transport eat from colder exterior air to warm the interior space. This heat transfer is achieved via control of the liquid/gas state change of a refrigerant.

A compressor receives the refrigerant in a gaseous state and through the introduction of pressure changes the state of the refrigerant into a liquid. This process will raise the temperature of the refrigerant. An interior heat exchanger enables heat transport from the hot refrigerant into the air of the interior space. Typically a fan is employed to transport interior air over the interior heat exchanger to facilitate this heat transfer.

The liquid refrigerant is then routed to evaporator. In the evaporator, the pressure provided by the compressor is released. This causes the refrigerant to vaporize from the liquid state into the gaseous state. Much of the heat of the liquid refrigerant is needed to provide the heat of vaporization. As a consequence, the gaseous refrigerant which emerges from the evaporator is at a much lower temperature than the entering liquid refrigerant.

This lower temperature gaseous refrigerant is then routed to an exterior heat exchanger. This exterior heat exchanger is similar to the interior heat exchanger, except that heat flows from the exterior air into the colder gaseous refrigerant. As in the case of the interior heat exchanger, the exterior heat exchanger typically has an exterior fan to transport exterior air over the exterior heat exchanger to facilitate the heat transfer. The gaseous refrigerant, with its temperature elevated by heat from the exterior air, is then routed to the compressor to repeat the cycle.

The net result of this cycle is the transportation of heat from the colder exterior air to warm the interior air. The temperature of the liquid refrigerant from the compressor would typically be 110 degrees Fahrenheit. The refrigerant would typically be cooled to approximately 100 degrees Fahrenheit in the interior heat exchanger by heating the interior air which would be approximately 70 degrees Fahrenheit. The gaseous refrigerant emerging from the evaporator would typically be much colder, approximately 0 degrees Fahrenheit. Exterior air in the range of 60 degrees Fahrenheit to 35 degrees Fahrenheit would typically heat the gaseous refrigerant to a temperature of approximately 28 degrees Fahrenheit. By thus controlling the liquid/gas state changes of the refrigerant it is possible t transport heat from the colder exterior to heat the warmer interior space. The amount of electrical energy required to transport this heat (the electrical power consumption of the compressor and the interior and exterior fans) is generally less than the electrical energy equivalent of this heat. Thus a heat pump provides greater heating than an electric resistance heater using the same amount of electrical power.

Heat pumps have some disadvantages and limitations which prevent their more widespread use. Firstly, heat transport mechanism is based upon the limited temperature differential achieved by converting the refrigerant from a gas to a liquid an then from a liquid back to a gas. This temperature differential must be greater than the temperature difference between the interior space and the exterior in order for the desired heat transfer to take place. In addition, the heat transport mechanism is most efficient when the temperature difference between the interior and exterior is minimal. Thus the heat transport process is least efficient at the same time the need for heat transfer is greatest, when the exterior ambient temperature is very low. As a consequence a heat pump system is often teamedwith an auxiliary heating unit, such as a gas or oil fired furnace, for use when the heat pump is inadequate to provide the desired interior temperature.

Secondly, there is a further factor that reduces the usefulness of heat pumps at low exterior ambient temperatures. The formation of frost on the exterior heat exchanger severely limits the usefulness of heat pumps. Because the refrigerant can have a temperature in the range of 0 degrees Fahrenheit, heat transfer could theoretically take place for exterior ambient temperatures below freezing (32 degrees Fahrenheit). However because of the low temperature of the refrigerant in the exterior heat exchanger, frost tends to form on the exterior heat exchanger from freezing of the humidity in the exterior air even when the exterior ambient temperature is above freezing. Typically frost would begin to form at exterior ambient temperatures in the range of 35 degrees Fahrenheit to 37 degrees Fahrenheit. The build up of such frost tends to insulate the exterior heat exchanger from the exterior air, thus inhibiting the heat transport process.

In accordance with the prior art there are systems which reverse the connection of the interior and exterior heat exchangers to provide defrosting. This results in the transport of the hot liquid refrigerant to the exterior heat exchanger causing the frost to be melted. Unfortunately, this causes the heat pump to act as an air conditioner, transporting heat from the interior to the exterior, generally at the very time that heating is most desired. Such a defrosting operation also consumes energy which does not contribute to heating. Detection of the proper times to defrost the exterior heat exchanger would thus save energy.

In the prior art there are known systems to detect the build up of frost or the conditions which are known to cause such build up. One technique known in the art involves defrosting based upon the total time of Operation of the compressor of the heat pump. Such systems typically employ a bimetal snap switch in the compressor circuit which is heated by the electric current supplied to the compressor. When the duty cycle of operation of the compressor and the time of the current operation reach a limit set by the characteristics of the bimetal snap switch, then the bimetal snap switch trips. This interrupts the compressor and triggers a defrosting operation. Such a system does not take into account the exterior conditions, such as temperature and humidity, which control the likelihood of frost formation. Thus this system can only provide an approximation of the time when defrosting is needed.

Another system known in the prior art employs the difference between the exterior ambient temperature and the exterior heat exchanger temperature to determine when defrosting is required. When this difference exceeds a predetermined amount, based upon the exterior ambient temperature, then a defrosting operation is begun. This technique detects the results of insulation of the exterior heat exchanger from the exterior air due to frost formation and is thus responsive to the particular ambient conditions. Such systems are not ideal for two reasons. These systems require a measure of two temperatures, requiring two temperature sensors. In addition, the triggering temperature difference, which is typically formed from a linear function of the exterior ambient temperature, is ordinarily a compromise employed for a number of different heat pumps. Further, it is known that the temperature difference upon frost formation for any particular heat pump will change due to aging caused by deterioration of motor bearings, partial loss of refrigerant and other factors. Thus this defrost operation criteria is only an approximation for any particular heat pump at any particular point in its useful life.

The two factors noted above limit the usefulness of the heat pump in certain climates. If the exterior ambient temperature will be below freezing for any significant portion of the heating season, then either heat pumps are only rarely installed or heat pumps must be backed up with an auxiliary heating unit. This results in the requirement for extra equipment which is only intermittently used. The prior art method for melting frost on the exterior heat exchanger places an additional heating load on the heating system at the same time that heat is most needed by cooling the interior space in order to heat the exterior heat exchanger.

Studies of the temperature patterns of many U.S. cities show that a reduction of only a few degrees in the lowest operating temperature of a heat pump would greatly increase the areas where heat pumps could be used exclusively and greatly reduce the need for auxiliary heat in other regions. Any method of operation of a heat pumps that can more reliably detect the presence of frost would enable better utilization of powered defrosting and therefore provide such an improvement in the lowest operating temperature. Therefore it would be very useful in the heat pump field to provide a method for reliable frost detection.

SUMMARY OF THE INVENTION

The present invention is a method and apparatus for determining the exterior ambient temperature in a heat pump. The heat pump defrosts the exterior heat exchanger if the exterior heat exchanger temperature has a predetermined relationship to the exterior heat temperature. The present invention is a manner of determining the exterior ambient temperature from a measurement of the temperature of the exterior heat exchanger. This technique thus eliminates the need for two temperature sensors to measure the two temperatures.

The present invention triggers a defrosting operation upon detection of a predetermined relationship between the temperature of the exterior heat exchanger and the exterior ambient temperature. The exterior heat exchanger temperature is measured directly via a temperature sensor. The improvement of the present invention includes operating the exterior fan after operation of the compressor, while repetitively measuring the temperature of the exterior heat exchanger. This operation of the exterior fan continues until a plateau is reached in the exterior heat exchanger temperature. The exterior ambient temperature is set equal to this plateau temperature, if the plateau temperature is other than freezing.

This technique works because the continued operation of the exterior fan causes the exterior heat exchanger temperature to move toward the exterior ambient temperature by taking on heat from the exterior air. Any plateau temperature, other than at freezing, indicates that the exterior heat exchanger temperature has reached the exterior ambient temperature. A plateau temperature at freezing cannot be so easily interpreted. It could be that the exterior ambient temperature is freezing. On the other hand, it could also be that the exterior ambient temperature is greater than freezing and that some frost has formed on the exterior heat exchanger. In that case, heat from the exterior air supplied by the exterior fan would melt the frost before raising the temperature of the exterior heat exchanger. Thus a plateau temperature at freezing does not indicate an exterior ambient temperature of freezing.

Special provisions are made if the plateau temperature is freezing. The exterior fan is continued in operation. If there is frost on the exterior heat exchanger and the exterior ambient temperature is above freezing, then the frost will eventually be melted and the temperature of the exterior heat exchanger will move toward the exterior ambient temperature. Detection of the second plateau temperature will yield the actual exterior ambient temperature. For a range of exterior ambient temperatures just above freezing, it is anticipated that the thermostat will require an additional compressor cycle prior to the time the exterior heat exchanger temperature reaches this second plateau or rises above freezing. In the case where a second plateau temperature is not reached, the exterior ambient temperature is set to a compromise temperature which is an approximation of the actual temperature. This compromise temperature is preferably near the center of the range of temperatures just above freezing where the thermostat demands another compressor cycle prior to reaching the second plateau. In the preferred embodiment this compromise temperature is 34 degrees Fahrenheit.

The exterior ambient temperature thus determined is employed in monitoring the heat pump for the accumulation of frost. The temperature of the exterior heat exchanger is continuously monitored during operation of the compressor. This temperature, together with the exterior ambient temperature determined in accordance with the present invention during the previous compressor off time, is employed to determine whether frost is forming on the exterior heat exchanger. If frost formation is detected, then the compressor cycle is interrupted and a defrosting operation is begun. This defrosting operation may be a powered defrosting operation in accordance with the prior art.

BRIEF DESCRIPTION OF THE DRAWINGS

These and other aspects and features of the present invention will become clear from the foregoing description of the invention taken in conjunction with the drawings, in which.

DETAILED DESCRIPTION OF THE PREFERRED EMBODIMENT

Figure 1:
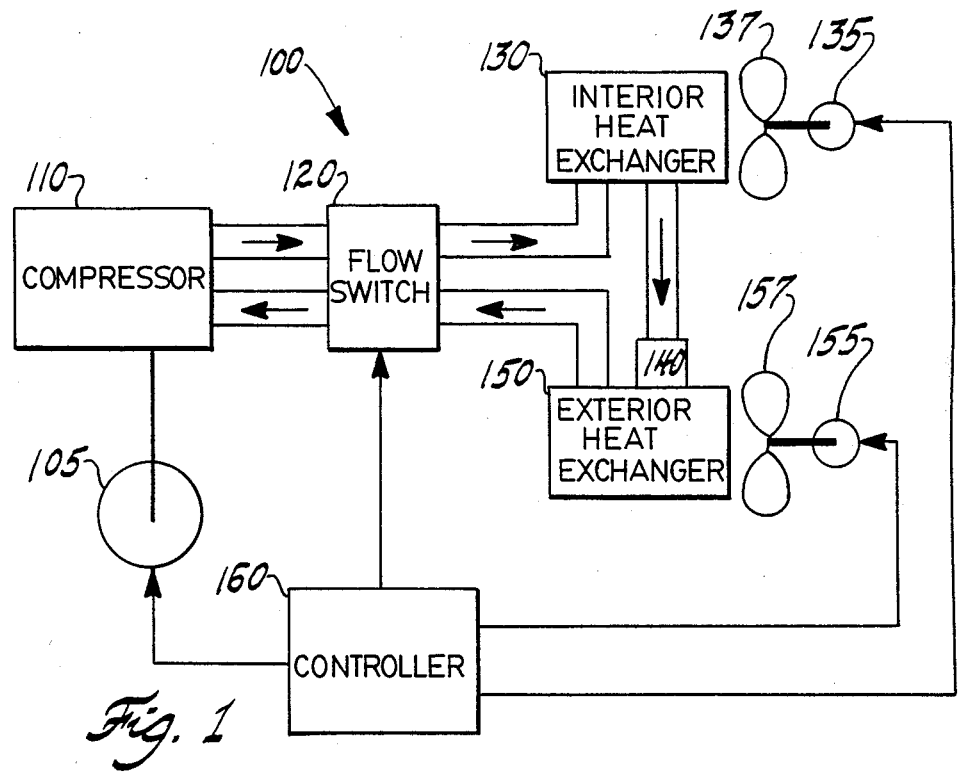
FIG. 1 illustrates the general arrangement of parts in the heat pump control system of the resent invention.

FIG. 1 illustrates schematically the parts of the present invention. Heat pump 100 includes compressor 110 driven by compressor motor 105, refrigerant flow switch 120, interior heat exchanger 130 which has associated therewith interior fan motor 135 and interior fan 137, evaporator 140, exterior heat exchanger 150 which has associated therewith exterior fan motor 155 and exterior fan 157, and controller 160.

As illustrated schematically in FIG. 1, refrigerant flows through the elements of the heat pump. The arrows of FIG. 1 illustrate the refrigerant flow through refrigerant flow switch 120 during normal operation of heat pump 100. As shown in FIG. 1, refrigerant flows from compressor 110, through refrigerant flow switch 120 to interior heat exchanger 130, to evaporator 140, to exterior heat exchanger 150, back to refrigerant flow switch 120, and then returns to compressor 110. This refrigerant flow path enables heat pump 100 to transport heat from the exterior to the interior. Refrigerant flow switch 120 is provided to enable a reversed flow operation of heat pump 100. The reversed flow is from compressor 110, through refrigerant flow switch 120 to exterior heat exchanger 150, through evaporator 140, through interior heat exchanger 130, back to refrigerant flow switch 120, and then returns to compressor 110. This refrigerant flow path enables heat pump 100 to transport heat from the interior to the exterior. This reverse flow operation is employed in accordance with the teachings of the prior art to defrost exterior heat exchanger 150.

Controller 160 is coupled to compressor motor 105, refrigerant flow switch 120, interior fan motor 135 and exterior fan motor 155. Controller 160 controls the operation of heat pump 100 by control of compressor motor 105, refrigerant flow switch 120, interior fan motor 135 and exterior fan motor 155. This control includes thermostatic control of the temperature of the interior space and control of defrosting exterior heat exchanger 150.

Figure 2:
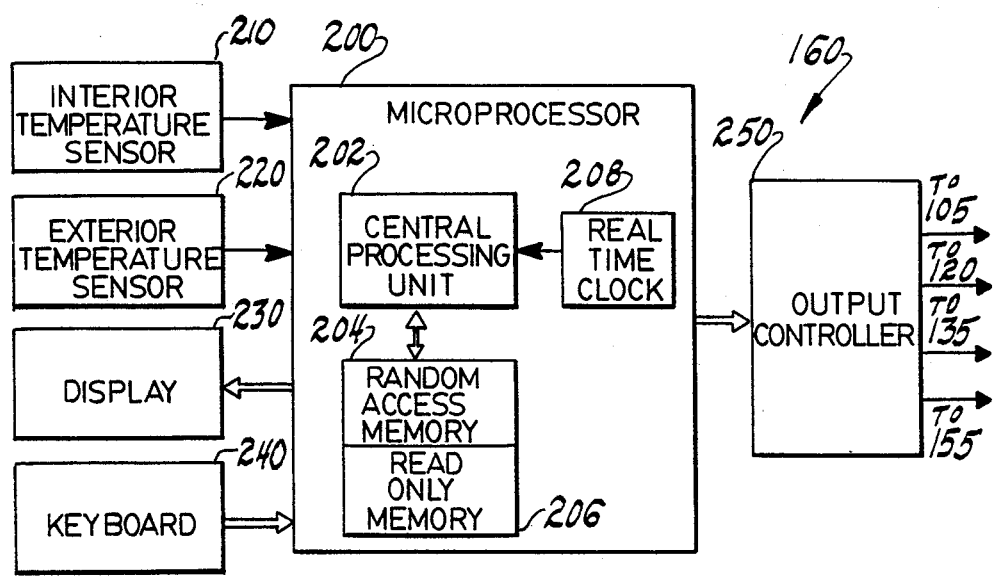
FIG. 2 illustrates further details of the heat pump controller illustrated in FIG. 1.

FIG. 2 illustrates controller 160 in further detail. Controller 160 includes microprocessor 200, interior temperature sensor 210, exterior temperature sensor 220, display 230, keyboard 240 and output controller 250. Interior temperature sensor 210 is a temperature sensor which measures the interior temperature. The interior temperature is employed in the thermostatic control of heat pump 100.

Exterior temperature sensor 220 measures the temperature of exterior heat exchanger 150 and enables determination of the exterior ambient temperature. These temperatures are employed in the control of frost. In the preferred embodiment of the present invention exterior temperature sensor 220 is a temperature sensor which is thermally coupled to the exterior heat exchanger and insulated from the exterior air, for measuring the temperature of exterior heat exchanger 150. The temperature of the exterior air is determined from the exterior heat exchanger temperature.

Display 230 is constructed in accordance with the prior art and is employed to send messages to the user of heat pump 100. Such messages could include the current time, the current interior temperature and the current desired temperature. In addition, display 230 can be employed in conjunction with keyboard 240 to provide feedback to the user during entry of commands via keyboard 240. Keyboard 240 is constructed in accordance with the prior art and is employed to enable operator control of heat pump 100. Keyboard 240 can be employed to enter the current time and the current desired temperature. In addition it is known in the art to provide a sequence of desired temperatures for particular times of the day via keyboard 240 for storage within microprocessor 200. This would enable microprocessor 200 to control heat pump 100 to provide a time/temperature profile corresponding to this stored sequence of desired temperatures at particular times.

Output controller 250 is connected to compressor motor 105, refrigerant flow switch 120, interior fan motor 135 and exterior fan motor 155. Output controller 250 includes one or more relays or semiconductor switching elements needed for switching the electrical power to these elements under the control of microprocessor 200.

Microprocessor 200 is constructed in accordance with the prior art. Microprocessor 200 includes: a central processing unit 202 for performing arithmetic and logic operations under program control; random access memory 204 for temporary storage of data, intermediate calculation results and the like; read only memory 206 which permanently stores a program for control of microprocessor 200 and may further store tables of constants employed in its operation; and real time clock 208 which provides an indicating of the current time. Typically microprocessor 200, including central processing unit 202, random access memory 204 read only memory 206, and real time clock 208, is formed on a single integrated circuit. Microprocessor 200 is in fact a miniature programmed computer. Proper selection of the program permanently stored in read only memory 206 during manufacture of microprocessor 200 enables the identical structure to perform a variety of tasks. Naturally the specification of a particular program in read only memory 206 causes that particular microprocessor to be dedicated to the particular task implemented by that program. The flexibility in design and manufacturing provided by this technique is highly advantageous in an art that is rapidly changing.

In operation the program stored in read only memory 206 causes microprocessor 200 to control the operation of heat pump 100. This program causes microprocessor 200 to receive the input signals from interior temperature sensor 210 and exterior temperature sensor 220 together with input commands from keyboard 240. Microprocessor 200 then provides an output to the user via display 230 and controls the operation of compressor motor 105, refrigerant flow switch 120, interior fan motor 135 and exterior fan motor 155 via output controller 250 in accordance to a program permanently stored in read only memory 206 in conjunction with the current time indicated by real time clock 208.

Figure 3:
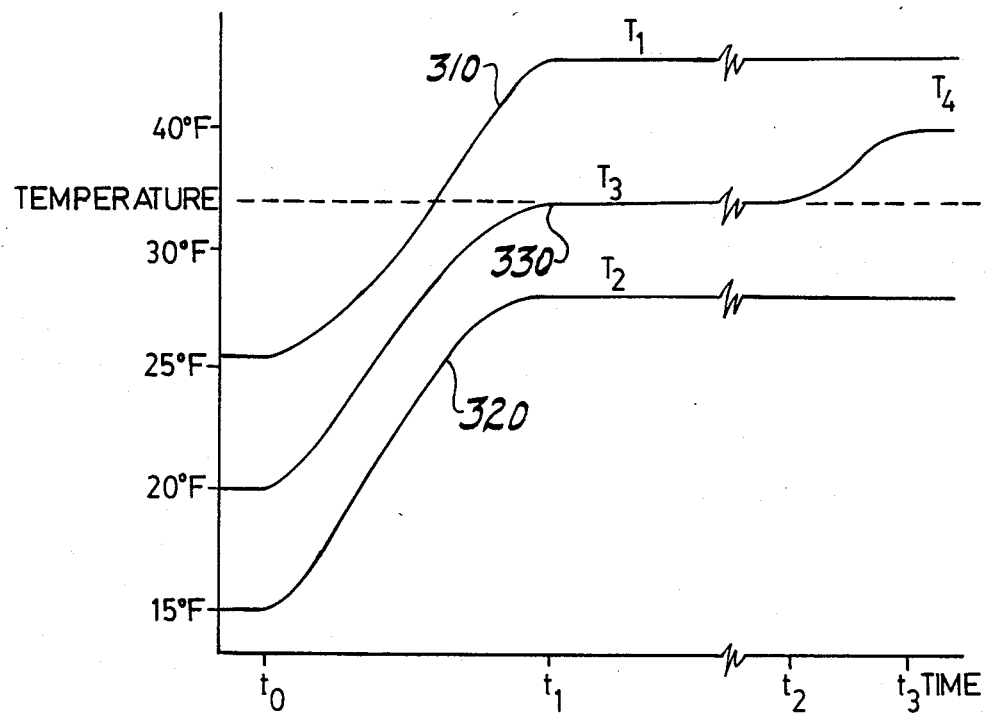
FIG. 3 illustrates the temperature versus time profile of the exterior heat exchanger for three differing conditions.

FIG. 3 illustrates the time/temperature profile of the exterior heat exchanger for times after the compressor is turned off. The vertical scale is in degrees Fahrenheit. Note that freezing (32 degrees Fahrenheit) is marked on the graph. FIG. 3 illustrates three cases in curves 310, 320 and 330, respectively.

In FIG. 3, time $t_0$ corresponds to the time in which he compressor is turned off. Prior to time $t_0$ the temperature measured by the sensor placed on exterior heat exchanger 150 corresponds to the lowest temperature achievable by heat pump 100 under operating conditions and is a function of the construction of the particular heat pump. At times following time $t_0$ the temperature of exterior heat exchanger 150 rises toward a quiescent level which is dependant upon the exterior ambient temperature.

Curve 310 shows a rise to a quiescent temperature $T_1$ which is above freezing. This condition occurs when the exterior ambient temperature is above freezing. In such an event no frost is formed on exterior heat exchanger 150.

Curve 320 shows a rise to a quiescent temperature $T_2$ which is below freezing. In this case the exterior ambient temperature is below freezing. In such an event it is unknown whether or not frost is formed on exterior heat exchanger 150. However, the formation of frost is likely and further it is clear that exterior heat exchanger 150 cannot be defrosted by running exterior fan 157 to move exterior air across exterior heat exchanger 150. This is because the exterior ambient temperature is below freezing.

Curve 330 shows a rise to a quiescent temperature $T_3$ equal to freezing, and a later rise in temperature starting at time $t_2$ to a further quiescent temperature $T_4$ at time $t_3$. This corresponds to the case in which there is an accumulation of frost on exterior heat exchange 150 and the exterior ambient temperature is above freezing. The temperature of exterior heat exchanger 150 rises to freezing. Any heat transported to exterior heat exchanger 150 thereafter does not raise its temperature but rather melts some of the frost. After all the frost is melted at time $t_2$ the temperature of exterior heat exchanger 150 again begins to rise. This reaches the level $T_4$ at time $t_3$.

A method for determining the exterior ambient temperature from the measured exterior heat exchanger temperature can be understood from FIG. 3. In accordance with one embodiment of the present invention, exterior fan 157 is operated after compressor 110 has been switched off. This serves to transport exterior air over exterior heat exchanger 150 and thereby raise the temperature of exterior heat exchanger 150 to the exterior ambient temperature. A plateau in the exterior heat exchanger temperature can be detected when this occurs. In such a case the exterior ambient temperature equals the plateau temperature. However, a plateau temperature of 32 degrees Fahrenheit does not necessarily indicate an exterior ambient temperature of 32 degrees Fahrenheit. As can be seen at curve 330, the time/temperature profile of exterior heat exchanger 150 may exhibit a first plateau at freezing (32 degrees Fahrenheit), caused by heat from the external air being absorbed in melting frost, followed by a later plateau at a higher temperature. It is only this later plateau temperature which corresponds to the exterior ambient temperature. Thus the exterior ambient temperature can be determined by monitoring the external heat exchanger temperature for the occurrence of a plateau at a temperature other than 32 degrees Fahrenheit.

As previously noted, it is anticipated that for a range of exterior ambient temperatures just above freezing the thermostat will require an additional compressor cycle before time $t_2$ when the exterior heat exchanger temperature rises above freezing. This occurs because the thermal load on the heat pump is too great to permit the compressor to be off for the interval between time $t_0$ and $t_2$. This range of exterior ambient temperatures is expected to be between 32 degrees Fahrenheit and 35 or 36 degrees Fahrenheit. In such a case the exterior ambient temperature will be set to a compromise temperature within this range, such as 34 degrees Fahrenheit.

Figure 4A:
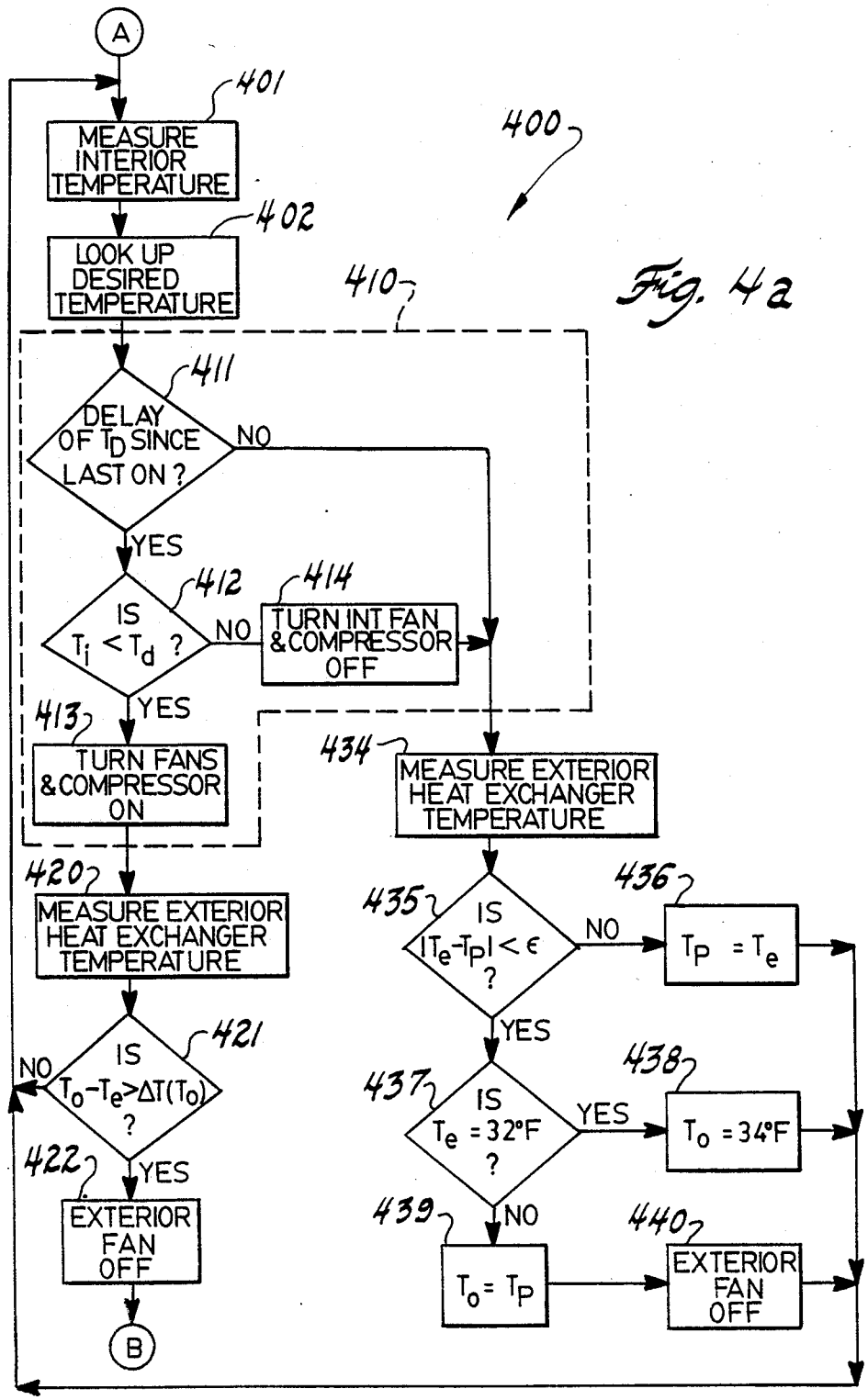
FIGS. 4a and 4b illustrate a flow chart of a program suitable for execution by the microprocessor illustrated in FIG. 2 for practicing the present invention.
Figure 4B:
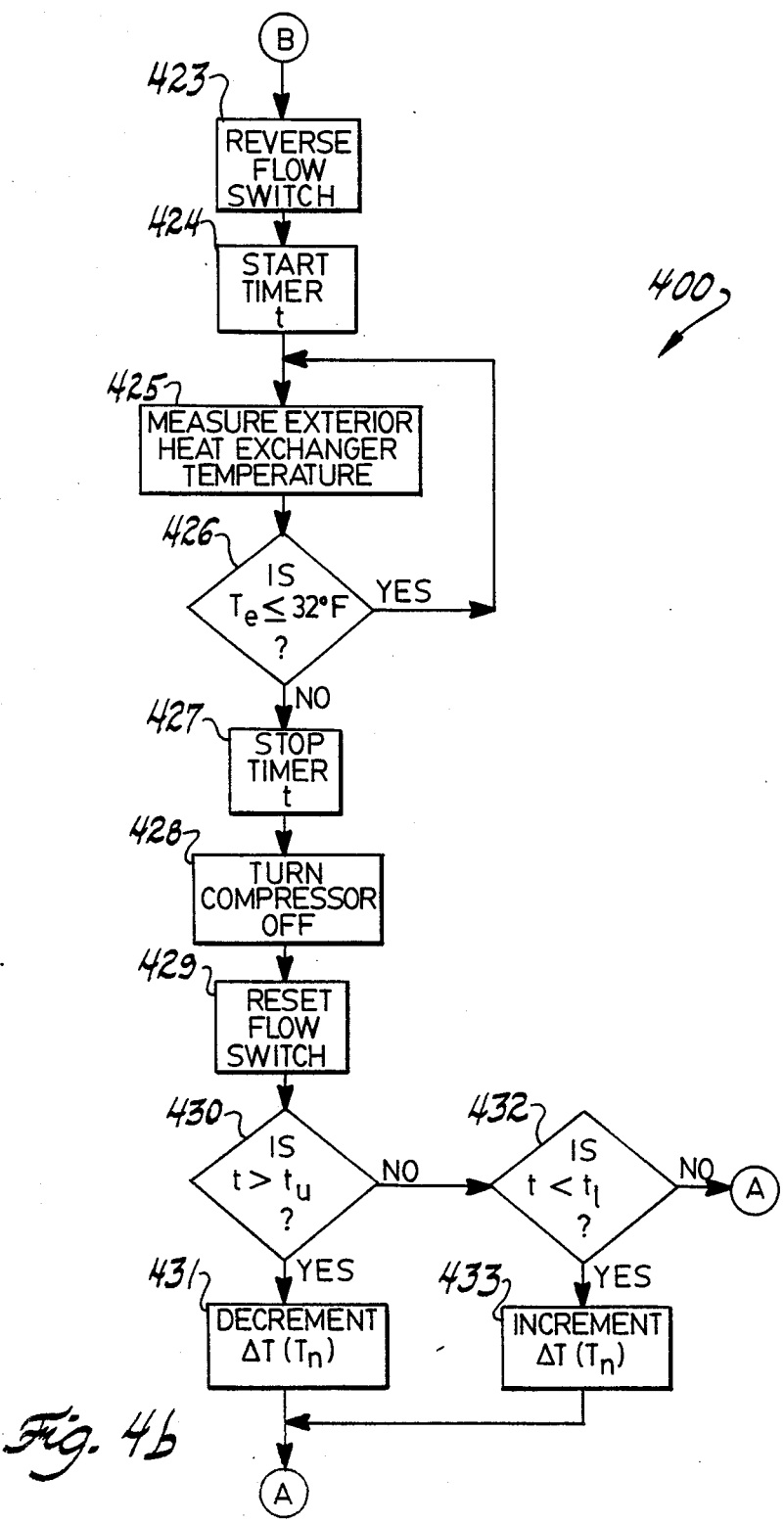

FIG. 4a and 4b illustrate a flow chart of program 400 used to control the operation of microprocessor 200 for achieving the thermostatic control and frost control in accordance with the present invention. Program 400 illustrated in FIG. 4 is not intended to show the exact details of the pro gram for control of microprocessor 200. Instead, program 400 is intended to illustrate only the overall general steps employed in this program. It should also be noted that program 400 illustrated in FIG. 4a and 4b does not show all of the control processes necessary to the control of heat pump 100. In particular, program 400 does not show the manner in which operator inputs are received from keyboard 240 or the manner in which display 230 is employed to send messages to the user. Since these necessary portions of the program for operation of microprocessor 200 are known in the art and form no part of the present invention, they are omitted from the present description. Those skilled in the art of microprocessor programming would be enabled to provide the exact details of the program for control of microprocessor 200 from program 400 illustrated here and the other descriptions of the present application once the selection of the type of microprocessor unit to embody microprocessor 200 is made, together with its associated instruction set.

Program 400 is a continuous loop which is performed repetitively. For convenience the description of this continuous loop is begun with processing block 401. In processing block 401, program 400 controls microprocessor 200 to measure the interior temperature. This process takes place by reading and processing the signal from interior temperature sensor 210. The preferred embodiment of the present invention employs the variable resistance of a thermistor as interior temperature sensor 210. Microprocessor 200 preferably controls an analog to digital conversion process to convert the resistance of such a thermistor into a digital number. Lastly, microprocessor 200 preferably converts this digital measure of the resistance of the thermistor into interior temperature $T_i$ using a look up table. This process and other methods for obtaining a digital signal indicative of temperature are known in the prior art.

Program 400 next determines desired temperature $T_d$ for the current time (processing block 402). This temperature could be a set point entered via keyboard 240. In accordance with the preferred embodiment, however, this desired temperature $T_d$ is recalled from a table containing a sequence of desired temperatures for particular times of the day stored within random access memory 204. The desired temperature $T_d$ for the particular time is recalled in conjunction with the current time indicated by real time clock 208. This process is known in the art and will not be further described. The essential element of this step in program 400 is to produce desired temperature $T_d$ for comparison with interior temperature $T_i$.

Program 400 next performs the thermostatic control of heat pump 100 (subroutine 410). This process includes control of the operation of compressor motor 105, refrigerant flowswitch 120, interior fan motor 135 and exterior fan motor 155 via output controller 250. Subroutine 410 illustrated in FIG. 4 shows a very simple comparison algorithm for this control process as an example only. This technique plus other more sophisticated techniques are known in the art.

Program 400 first determines, if compressor 110 is now off, whether it has been off for longer than a predetermined period of time $t_d$ (decision block 411). This test is provided to insure a minimum off time whenever compressor 110 is turned off in order to protect motor 105. If compressor 110 is off and has not been off for the required interval $t_d$, then the rest of thermostatic subroutine 410 is bypassed and control passes to processing block 434. If compressor 110 is on, or if compressor 110 has been off for longer than the interval $t_d$, then the remainder of thermostatic subroutine 410 is executed.

Program 400 compares measured interior temperature $T_i$ with desired temperature $T_d$ (decision block 412). If measured interior temperature $T_i$ is less than desired temperature $T_d$, then compressor motor 105, interior fan motor 135 and exterior fan motor 155 are turned on or remain on if they are already on processing block 413. This takes place by microprocessor 200 sending the proper commands to output controller 250 for actuating these motors. This serves to actuate heat pump 100 to begin transportation of heat from the exterior to the interior. Program 400 then tests whether frost has formed on exterior heat exchanger 150 in a manner which will be described below.

If measured interior temperature $T_i$ is not less than desired temperature $T_d$, then compressor motor 105 and interior fan motor 135 are turned off or remain off (Processing block 414). As before, this is achieved by microprocessor 200 issuing the necessary commands to output controller 250 for deactuating these motors. Note that exterior fan motor 155 is separately controlled in accordance with the present invention.

The remainder of program 400 is concerned with the defrosting operation of heat pump 100. There are two branches, one entered when heat pump 100 is operating and one entered when heat pump 100 is not operating. If heat pump 100 is operating, then program 400 tests to determine if frost has formed. If this is the case the operation of heat pump 100 is interrupted and a defrosting operation is begun. If heat pump 100 is not operating, program 400 operates to determine the exterior ambient temperature.

Program 400 repetitively tests for frost formation if heat pump 100 is operating. This takes place by comparison of the exterior heat exchanger temperature and the exterior ambient temperature. Program 400 firstly measures the exterior heat exchanger temperature $T_e$ (processing block 420). In the preferred embodiment, exterior sensor 220 includes a thermistor which is in thermal contact with exterior heat exchanger 150 and insulated from the exterior air. Microprocessor 200 preferably determines the exterior heat exchanger temperature $T_e$ in the same manner described above with regard to determination of the interior temperature $T_i$.

Program 400 next tests to determine whether the difference between the previously determined exterior ambient temperature $T_o$ and the just measured exterior heat exchanger temperature $T_e$ is greater than a predetermined frost formation difference function $\Delta T(T_o)$ (decision block 421). In accordance with the preferred embodiment, this predetermined frost formation difference function $\Delta T(T_o)$ is adjustable by microprocessor 200. In this preferred embodiment, the corresponding difference value of the predetermined frost formation difference function $\Delta T(T_o)$ for each exterior ambient temperature $T_o$ is stored in a look up table in random access memory 204. The manner of adjustment of this predetermined frost formation difference function $\Delta T(T_o)$ will be described below. The predetermined frost formation difference function $\Delta T(T_o)$ is set in accordance with the equation:

$$\Delta T(T_o) = \frac{7 \times T_o}{8} + 12$$

upon initial application of electric power to controller 160, prior to any adjustment. Microprocessor 200 is programmed to provide this linear function for the predetermined frost formation difference function $\Delta T(T_o)$ initially. If the difference between the exterior ambient temperature $T_o$ and the exterior heat exchanger temperature $T_e$ does not exceed this predetermine frost formation difference function $\Delta T(T_o)$, then frost is not detected. Program 400 returns to processing block 401 to repeat the control process. If the difference exceeds the predetermined frost formation difference function $\Delta T(T_o)$, then external fan 157 is turned off (processing block 422). Then program 400 provides a powered defrost operation. Thus the operation of heat pump 100 is interrupted when frost is detected.

Program 400 next performs a powered defrost cycle. Program 400 reverses refrigerant flow switch 120 (processing block 423). This is accomplished by provision of the proper command from microprocessor 200 to output controller 250. This causes the heated liquid refrigerant from compressor 110 to be supplied to exterior heat exchanger 150 for defrosting and incidentally removing heat from the interior space via interior heat exchanger 130 in the process.

In accordance with the preferred embodiment of the present invention, the frost formation difference function $\Delta T(T_o)$ is adjusted based upon the time required for the defrost operation. Accordingly, microprocessor 200 is programmed to time this operation. Thus a timer is started (processing block 424) to time the defrosting operation.

Program 400 then measures the exterior heat exchanger temperature $T_e$ in the same manner as previously described processing block 425). program 400 then tests to determine if exterior heat exchanger temperature $T_e$ is less than or equal to freezing (decision block 426). If this is true then control returns to processing block 425 to repeat the temperature measurement. The program 400 remains in this loop until exterior heat exchanger temperature $T_e$ is greater than freezing (decision block 426).

Once this occurs then the defrosting operation is stopped. Program 400 stops the timer (processing block 427) thereby yielding an elapsed time t. Program then turns off compressor motor 105 (processing block 428) and resets refrigerant flow switch 120 to normal flow (processing block 429). This completes the defrosting operation.

Program 400 next uses the elapsed time t to determine if the frost formation difference function $\Delta T(T_o)$ should be adjusted. It is believed that the time to defrost exterior heat exchanger 150 is best kept within a narrow range. It is believed that the ideal length of time for the defrosting operation is in the range of 5 minutes. If the time to defrost is greater than the ideal time, then heat pump efficiency is reduced due to excessive frost formation. If the time to defrost is less than the ideal time, then energy is wasted through defrosting more frequently than necessary. Deviation from the ideal time is employed to adjust the frost formation difference function $\Delta T(T_o)$ to bring the defrost time closer to the ideal value.

The adjustment of the frost formation difference function $\Delta T(T_o)$ takes place as follows. Program 400 tests to determine if the elapsed time t is greater than an upper limit value $t_u$ (decision block 430). This upper limit value is set at six minutes in accordance with the preferred embodiment of the present invention. If this is the case then the frost formation difference function $\Delta T(T_o)$ at the current exterior ambient temperature $T_n$ is decremented (processing block 431). This serves to reduce the temperature difference needed to trigger a defrosting operation at the particular external ambient temperature $T_n$, thus causing more frequent and shorter defrosting. In the preferred embodiment in which the frost formation difference function $\Delta(T_o)$ is stored in random access memory 204, this is achieved by subtracting a small amount from the value of $\Delta T$ stored in the memory location corresponding to the current exterior ambient temperature $T_n$.

If the elapsed time t is not greater than the upper limit $t_u$, teen program 400 test to determine if the elapsed time t is less than a lower limit $t_l$ (decision block 432). In accordance with the preferred embodiment of the present invention, this lower limit value is set at four minutes. If this is not the case, then elapsed time t is between upper limit $t_u$ and lower limit $t_l$, therefore no adjustment of the frost formation difference function $\Delta T(T_o)$ is required. Accordingly, program 400 returns to processing block 401 via entry point A. If elapsed time t is less than the lower limit $t_l$, then the value of the frost formation difference function $\Delta T(T_o)$ at the current exterior ambient temperature $T_n$ is incremented (processing block 433). This serves to increase the temperature difference needed to trigger a defrosting operation at the particular external ambient temperature $T_n$, thus causing less frequent and longer defrosting. In the preferred embodiment, this is achieved by adding a small amount to the value of $\Delta T$ stored in the memory location corresponding to the current exterior ambient temperature $T_n$.

This adjustment of the frost formation difference function $\Delta T(T_o)$ described above is on a point by point basis. That is, each adjustment changes only a single point of the function. Recall that the frost formation difference function $\Delta T(T_o)$ is initially set as a linear approximation in accordance with the following equation:

$$\Delta T(T_o) = \frac{7 \times T_o}{8} + 12$$

This initial approximation of the frost formation difference function $\Delta T(T_o)$ is adjusted repeatedly for each defrosting operation which requires a time outside the upper and lower limit values.

The above discussion of the adjustment of the frost formation function $\Delta T(T_o)$ is based upon a predetermined upper limit value $t_u$ and a predetermined lower limit value $t_l$. Alternatively, the upper limit value $t_u$ and the lower limit value $t_l$ could be operator selectable upon installation of heat pump 100. In this manner a single type of microprocessor 200 can serve as the controller for differing heat pump installations with differing compressors 110, interior heat exchangers 130 and exterior heat exchangers 150, and thus differing frost forming characteristics.

Program 400 enters another branch if heat pump 100 is not operating. This branch of program 400 is entered only when compressor motor 105 and interior fan motor 135 are already turned off (decision block 411) or when compressor motor 105 and interior fan motor 135 have just been turned off (processing block 414). Note that if another type of thermostatic control process is employed in place of that illustrated in subroutine 410, this program branch is entered immediately after the compressor motor 105 and the interior fan motor 135 are turned off.

Program 400 measures the exterior heat exchanger temperature $T_e$ (processing block 434). This takes place in the same manner as previously described above in relation to processing block 420. Program 400 then tests to determine if the absolute value of the difference between the last measured temperature of the exterior heat exchanger $T_e$ and the prior measured temperature of the exterior heat exchanger $T_p$ is less than a small value $\epsilon$ (decision block 435). This test determines if the temperature of the exterior heat exchanger 150 has reached a plateau or not. If this test fails, indicating that the temperature is changing, then the prior measured temperature of the exterior heat exchanger $T_p$ is set equal to the last measured temperature of the exterior heat exchanger $T_e$ (processing block 436) and control is returned to processing block 401 to repeat the control process. The minimum off time enforced by decision block 411 ensures that this plateau determination is done many times each off cycle.

Once a plateau temperature is reached, program 400 tests to determine if the exterior heat exchanger temperature $T_e$ is equal to freezing (decision block 437). If this is the case, then the exterior ambient temperature is set to the compromise temperature (processing block 438), which is preferably 34 degrees Fahrenheit.

In case the plateau temperature $T_p$ is not freezing, then program 400 sets the exterior ambient temperature $T_o$ equal to the plateau temperature $T_p$ (processing block 439). As noted above in conjunction with FIG. 3, under these conditions exterior fan 157 causes the plateau temperature $T_p$ of the exterior heat exchanger 150 to be the exterior ambient temperature. Thus the exterior ambient temperature $T_o$ can be determined without the need for an additional sensor. This exterior ambient temperature $T_o$ is employed in other portions of program 400. The exterior fan is turned off (processing block 440) and control returns to processing block 401 to repeat the control process. Note that if no plateau temperature is reached, then the exterior ambient temperature $T_o$ is not reset. In such a case the previous exterior ambient temperature is unchanged.

The above described process has two advantageous features. These both come from the fact that controller 160 adjusts the frost determination function based upon actual experience in defrosting the particular heat pump 100. Firstly, the process adapts to the particular installation. While the initial frost formation difference function equation may be an appropriate approximation for many heat pumps, the above described process optimizes the frost determination for the particular heat pump employing feedback from actual use. Secondly, the adjustment of the frost determination corrects for any drift in the characteristics of the particular heat pump. It is known in the art that the temperature difference at frost formation for any particular heat pump changes with wear and aging of the equipment. In particular, the level of refrigerant in the heat pump, which is subject to slow leakage during use, effects the temperature difference upon frost formation. Therefore the present invention advantageously adapts to the particular characteristics of the heat pump at the particular time.

We claim:

1. A method for determining the exterior ambient temperature in a heat pump having a compressor, an interior heat exchanger, and exterior heat exchanger, an exterior fan for moving exterior air past the exterior heat exchanger, and a thermostatic control means for cycling the compressor ON and OFF in accordance with heating demand, the improvement comprising the steps of:

repetitively measuring the temperature of the exterior heat exchanger immediately following the thermostatic control means cycling OFF the compressor until said measured temperature of the exterior heat exchanger reaches a plateau temperature other than freezing;

operating said exterior fan immediately following the thermostatic control means cycling OFF the copmressor at least until the exterior heat exchanger reaches said plateau temperature other than freezing; and determining the exterior ambient temperature as said plateau temperature.

2. The method for determining the exterior ambient temperature in a heat pump of claim 1, further comprising the steps of:

continuing to operate the exterior fan if said measured temperature of the exterior heat exchanger reaches a plateau temperature equal to freezing, and ceasing operation of the exterior fan if said measured temperature of the exterior heat exchanger reaches a plateau temperature other than freezing.

3. The method for determining the exterior ambient temperature in a heat pump of claim 2, further comprising the step of:

determining the exterior ambient temperature as a predetermined temperature slightly above freezing if said measured temperature of the exterior heat exchanger reaches a plateau temperature equal to freezing.

4. The method for determining the exterior ambient temperature in a heat pump of claim 3, wherein:

said predetermined temperature slightly above freezing is 34 degrees Fahrenheit.

5. The method for determining the exterior ambient temperature in a heat pump of claim 1, further comprising the step of:

determining the exterior ambient temperature as said the prior exterior ambient temperature if said exterior heat exchanger temperature fails to reach a plateau temperature prior to the thermostatic control means cycling the compressor ON.

6. An electronic thermostat for control of a heat pump for heating an interior space, the heat pump including a compressor, an interior heat exchanger, an interior fan for moving interior air past the interior heat exchanger, an evaporator, an exterior heat exchanger and an exterior fan for moving exterior air past the exterior heat exchanger, said electronic thermostat comprising:

an interior temperature sensor for generating a digital interior temperature signal indicative of the ambient air temperature within the interior space;

a desired temperature means for generating a digital desired temperature signal indicative of a predetermined desired temperature;

a first control means connected to the compressor, the interior fan, the exterior fan, said interior temperature sensor and said desired temperature means for cycling the compressor and the interior fan ON and OFF to warm the interior space based upon the relationship between said interior temperature signal and said desired temperature signal;

an exterior heat exchanger temperature sensor for generating a digital exterior heat exchanger temperature signal indicative of the temperature of the exterior heat exchanger;

an exterior ambient temperature means connected to the exterior fan, said first control means and said exterior heat exchanger temperature sensor for repetitively comparing said digital exterior heat exchanger temperature signal with the prior digital exterior heat exchanger temperature signal immediately following said first control means cycling OFF the compressor until said digital exterior heat exchanger temperature signal reaches a plateau temperature other than freezing, operating said exterior fan immediately following said first control means cycling OFF the compressor at least until said digital exterior heat exchanger signal reaches said plateau temperature other than freezing, and generating a digital exterior ambient temperature signal corresponding to said plateau temperature.

7. The electronic thermostat for control of a heat pump as claimed in claim 6, wherein:

said exterior ambient temperature means continues to operate the exterior fan if said digital exterior heat exchanger temperature signal reaches a plateau temperature equal to freezing, and ceasing operation of the exterior fan if said digital exterior heat exchanger temperature signal reaches a plateau temperature other than freezing.

8. The electronic thermostat for control of a heat pump as claimed in claim 7, wherein:

said exterior ambient temperature means generates said digital exterior ambient temperature signal corresponding to a predetermined temperature slightly above freezing if said measured temperature of the exterior heat exchanger reaches a plateau temperature equal to freezing.

9. The electronic thermostat for control of a heat pump as claimed in claim 8, wherein:

said predetermined temperature slightly above freezing is 34 degrees Fahrenheit.

10. The electronic thermostat for control of a heat pump as claimed in claim 6, further comprising:

a second control means connected to the compressor, the interior fan, the exterior fan, said first control means, said exterior heat exchanger temperature sensor, and said exterior ambient temperature means for interrupting operation of the compressor and initiating a primary defrosting operation to defrost the exterior heat exchanger if said digital exterior heat exchanger signal and said digital exterior ambient temperature signal have a predetermined relationship.

11. The electronic thermostat for control of a heat pump as claimed in claim 6, wherein:

said exterior ambient temperature means further includes means for
generating a digital exterior ambient temperature signal corresponding to the prior digital exterior ambient temperature if said digital exterior heat exchanger temperature signal fails to reach a plateau temperature prior to said first control means cycling the compressor ON.

* * * * *

UNITED STATES PATENT AND TRADEMARK OFFICE
CERTIFICATE OF CORRECTION

PATENT NO. : 4,910,966

DATED : March 27, 1990

INVENTOR(S) : Levine et al.

It is certified that error appears in the above-identified patent and that said Letters Patent is hereby corrected as shown below:

Column 1, line 13, "eat" should be --heat--;

Column 1, line 60, "t" should be --to--;

Column 2, line 15, "teamedwith" should be --teamed with--;

Column 2, line 37, "the prior art" should be --the prior art,--;

Column 2, line 52, "Operation" should be --operation--;

Column 4, line 63, "resent" should be --present--;

Column 6, line 31, "indicating" should be --indication--;

Column 6, line 65, "he" should be --the--;

Column 7, line 26, "exchange" should be --exchanger--;

Column 7, line 52, "(32 degrees Fahrenheit),caused" should be --(32 degrees Fahrenheit), caused--;

UNITED STATES PATENT AND TRADEMARK OFFICE
CERTIFICATE OF CORRECTION

PATENT NO. : 4,910,966  
DATED : March 27, 1990  
INVENTOR(S) : Levine et al.

It is certified that error appears in the above-identified patent and that said Letters Patent is hereby corrected as shown below:

Column 8, line 4, "FIG. 4a and 4b" should be --FIGS. 4a and 4b--;

Column 8, line 9, "pro gram" should be --program--;

Column 8, line 63, "flowswitch" should be --flow switch--;

Column 9, line 17, "processing block 413" should be --(processing block 413)--;

Column 9, line 27, "(Processing block 414)" should be --(processing block 414)--;

Column 10, line 14, "predetermine" should be --predetermined--;

Column 10, line 42, "processing block 425)" should be --(processing block 425)--;

Column 10, line 42, "program" should be --Program--;

Column 10, line 65, "!f" should be --If--;

UNITED STATES PATENT AND TRADEMARK OFFICE
CERTIFICATE OF CORRECTION

PATENT NO.  : 4,910,966
DATED       : March 27, 1990
INVENTOR(S) : Levine et al.

It is certified that error appears in the above-identified patent and that said Letters Patent is hereby corrected as shown below:

Column 11, line 16, " $\Delta(T_o)$ " should be -- $\Delta T(T_o)$ --;

Column 11, line 22, "teen" should be --then--;

Column 13, line 2, "There fore" should be --Therefore--;

Column 13, line 23, "copmressor" should be --compressor--.

Signed and Sealed this

Sixth Day of August, 1991

Attest:

HARRY F. MANBECK, JR.

Attesting Officer

Commissioner of Patents and Trademarks